June 2, 1959   P. E. BOCQUET   2,888,807
PROCESS OF REMOVING CARBON DIOXIDE FROM NATURAL GAS
Filed Oct. 6, 1955   3 Sheets-Sheet 1

INVENTOR.
PHILIP E. BOCQUET
BY
ATTORNEY

United States Patent Office 2,888,807
Patented June 2, 1959

2,888,807

PROCESS OF REMOVING CARBON DIOXIDE FROM NATURAL GAS

Philip E. Bocquet, Ponca City, Okla., assignor to Constock Liquid Methane Corporation, New York, N.Y., a corporation of Delaware Application October 6, 1955, Serial No. 538,863

8 Claims. (Cl. 62—11)

This invention relates to improvements in the art of removing carbon dioxide from natural gas, and more particularly, but not by way of limitation, to an improved method of removing carbon dioxide from natural gas by distillation.

As it is well known in the petroleum industry, natural gas flowing from a well frequently contains carbon dioxide. The concentration of the carbon dioxide will vary from well-to-well, or field-to-field, and normally is in the range of from one mole percent to 30 mole percent. In many uses of natural gas, the carbon dioxide is detrimental either to the end use of the gas or to the processing of the gas. For example, carbon dioxide is extremely detrimental in a process of liquefaction of the natural gas, since it tends to solidify at many temperature and pressure conditions. Ordinarily, the carbon dioxide is removed by scrubbing the gas stream with an aqueous solution of an amine, such as tri- or di-ethanol amine. Such a method is expensive, and is generally used in removing the carbon dioxide when the concentration is only 1 or 2 mole percent. With higher concentrations, the cost is frequently prohibitive.

An important object of this invention is to provide an economical process of removing carbon dioxide from natural gas.

Another object of this invention is to provide a process of removing carbon dioxide from natural gas, regardless of the concentration of the carbon dioxide.

Another object of this invention is to remove carbon dioxide from natural gas by a distillation process.

A further object of this invention is to remove carbon dioxide from natural gas without the formation of solid carbon dioxide.

Another object of this invention is to provide a process of removing carbon dioxide from natural gas, wherein the equipment required for performing the process may be simple in construction and well known in the petroleum industry.

A still further object of this invention is to provide a simple process of removing the major portion of carbon dioxide from natural gas, particularly when the gas contains a high concentration of carbon dioxide.

Other objects and advantages of this invention will be evident from the following detailed description, when read in conjunction with the accompanying drawings, which illustrate the invention.

In the drawings:

Figure 3 is a phase diagram for methane-carbon dioxide mixtures at 673 p.s.i.a.

Figure 4 is a phase diagram for methane-carbon dioxide mixtures at 715 p.s.i.a.

Broadly stated, the present invention may be defined as the process of separating carbon dioxide from a methane feed stream in which it is present, which comprises passing such stream through the following towers:

(a) Tower A, the effluent from the top of which is substantially pure methane, the feed to which contains a concentration of carbon dioxide below that at which cooling thereof, at the operating pressure of the tower, a solid carbon dioxide phase will not form and wherein the operating pressure is in the vicinity of but below the critical pressure of methane and through which a part of the substantially pure methane effluent from the top of the tower, after liquefaction, is refluxed and the bottom temperature is maintained such that solidification of carbon dioxide is precluded, and (b) Tower B, the feed to which contains a concentration of carbon dioxide sufficient such that upon cooling thereof below that certain pressure at which a solid carbon dioxide phase will exist and above which pressure solid carbon dioxide will not coexist with a vapor and wherein the operating pressure is maintained in the vicinity of but above said certain pressure.

Figure 1:
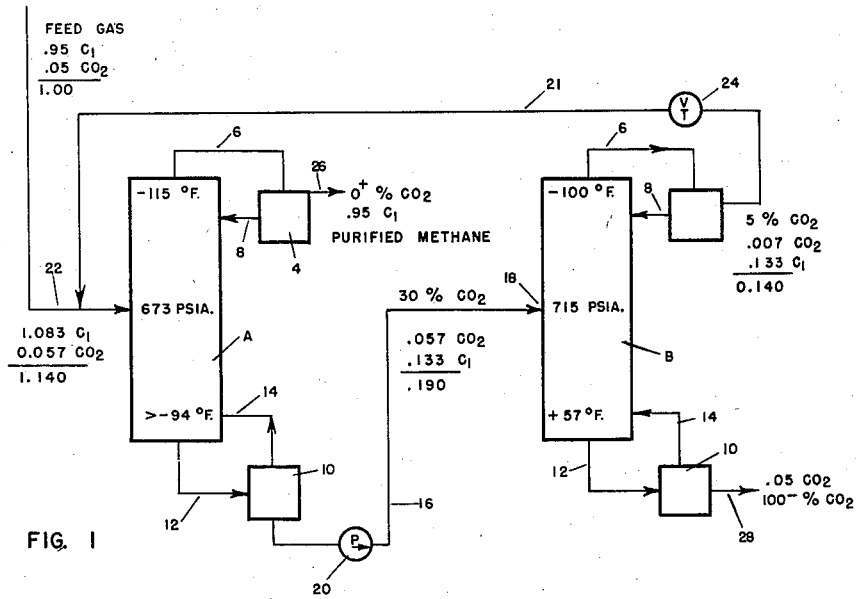
Figure 1 is a flow diagram illustrating a process of removing carbon dioxide from natural gas when the concentration of the carbon dioxide is less than 8 mole percent.

Referring to the drawings in detail, and particularly Figure 1, reference letters A and B designate distillation towers of the type ordinarily found in the petroleum refining industry. Each of the towers A and B has the usual reflux unit 4 connected to the upper end thereof by conduits 6 and 8. Also, each reflux unit 4 is supplied with an outside source of refrigeration (not shown) to cool the reflux fluid, as will be more fully hereinafter set forth.

Each of the towers A and B also has a reboiler 10 connected to the lower end of the respective tower by conduits 12 and 14. The reboilers 10 are each provided with an external source of heat (not shown) in the usual manner to maintain the desired temperature conditions in the lower portions of the towers A and B in a manner common to the art. The reboiler 10 of the tower A is connected by a conduit 16 to the inlet 18 of the tower B, and has a pressurizing means 20, such as a compressor, interposed therein to increase the pressure of the fluid directed to the tower B, as will be more fully hereinafter set forth. Also, the reflux unit 4 of the tower B is interconnected by a conduit 21 to the inlet conduit 22 of the tower A. A suitable throttling valve 24 is interposed in the conduit 21 to reduce the pressure of the recycled fluid entering the tower A.

The feed gas which may be processed in the manner illustrated in Figure 1 must be predominantly methane and should contain less than 8 mole percent carbon dioxide. The various figures shown in the drawing designate the percentage components based on one mole of a typical gas stream at the respective points in the process when the feed gas has a concentration of 5 mole percent. $CO_2$ refers, of course, to carbon dioxide, and $C_1$ refers to the remainder of the gas stream, which, as previously stated, is predominantly methane. The feed gas containing the carbon dioxide is initially introduced to the central portion of the tower A where the stream will be distilled to provide a top effluent of substantially pure methane, and a bottom effluent rich in carbon dioxide.

The tower A should be retained at a pressure less than 673 p.s.i.a., the critical pressure of methane. In order to obtain the desired distillation, the top effluent, which is substantially pure methane, must be liquefied and refluxed through the top of the tower A through conduit 8. The respective reflux unit 4 cools and liquefies the effluent discharging from the tower through the conduit 6, and maintains the top temperature of the tower A lower than —115° F., the critical temperature of methane. Since the methane must be liquefied to obtain the necessary distillation, the pressure of tower A cannot exceed the critical pressure of methane.

The bottom effluent of the tower A flows through the respective conduit 12, reboiler 10, and conduit 14 to maintain the bottom temperature of the tower A below the triple-point temperature at or above which solid carbon dioxide will form. The reboiler 10 of the tower A preferably maintains the bottom temperature of the tower A below approximately −94° F. This temperature is sufficient to prevent the solidification of carbon dioxide, yet is sufficiently high to provide an efficient distillation of the feed stream within the tower A.

It is also desirable that the pressure of the tower A be maintained as high as possible, considering the limitations previously described. As the pressure of the tower A decreased, the possibility of solid carbon dioxide formation is enhanced. In other words, when the pressure of the tower A is at approximately 673 p.s.i.a., the feed stream can contain a concentration of carbon dioxide approximating 8 mole percent without the solidification of the carbon dioxide on the feed plates (not shown) of the tower A. However, if the pressure of the tower A is reduced substantially below 673 p.s.i.a., solid carbon dioxide will form in the tower unless the concentration of carbon dioxide in the feed stream is similarly decreased.

Figure 3:
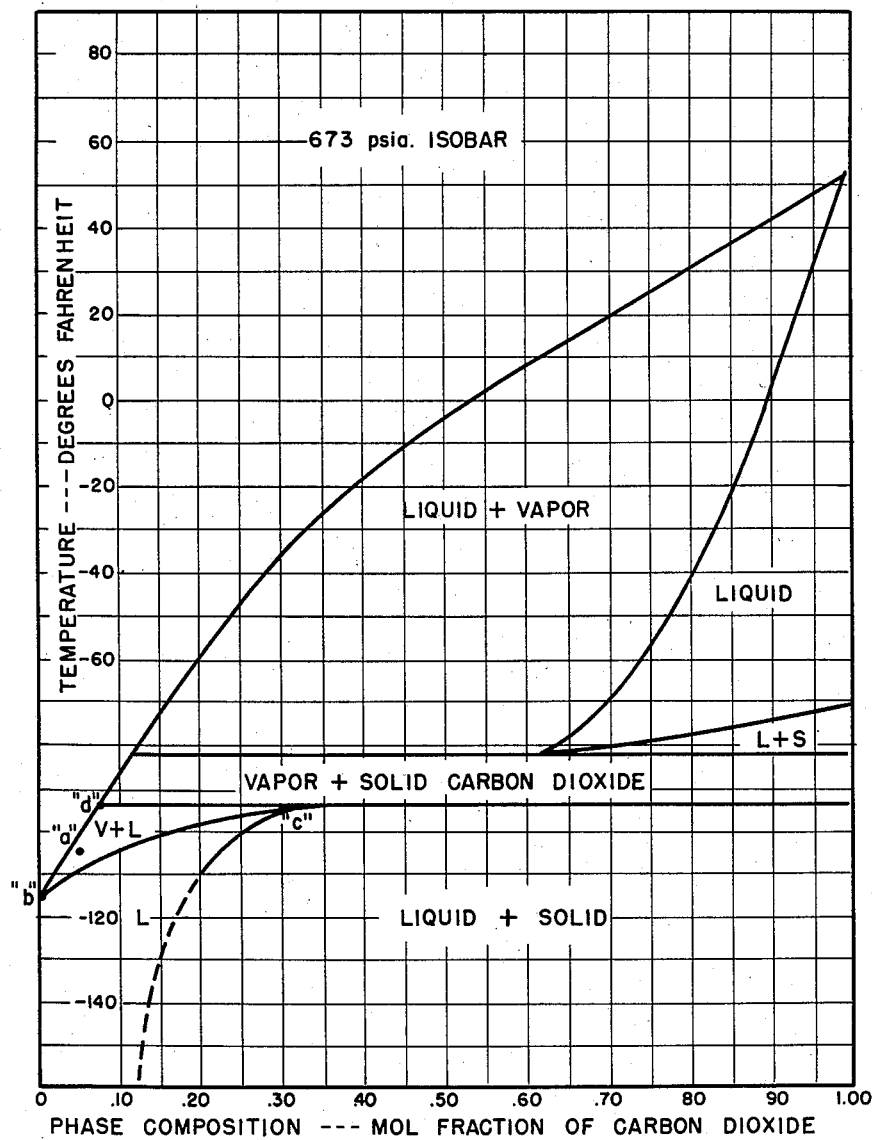

In order to facilitate an understanding of the operation of tower A, I have shown the phase diagram (Fig. 3) for methane-carbon dioxide mixtures at 673 p.s.i.a. It will be observed that the solid carbon dioxide zone extends between two liquid-vapor zones. As a result, if a methane stream contains a concentration of carbon dioxide greater than approximately 8 mole percent, and this stream is cooled, the carbon dioxide will solidify somewhere between −82° F. and −94° F., depending upon the carbon dioxide concentration. Therefore, I maintain the carbon dioxide concentration in the feed stream to the tower A at below 8 mole percent.

In theory (for the example previously described) the feed stream enters tower A at point $a$ on the phase diagram and the stream is separated by distillation into a methane-rich top product represented by point $b$, and a carbon dioxide-rich bottom product represented by point $c$. The line $bd$ represents the compositions of the gas phase rising through the tower, and the line $bc$ represents the compositions of the liquid falling through the tower. Thus, the major portion of the methane is removed in tower A as a substantially pure product, without the formation of solid carbon dioxide.

The outlet 26 of the reflux unit 4 for the tower A communicates with any desired apparatus (not shown) to provide a storage or further processing of the substantially pure methane. Only a fraction of a percent of carbon dioxide will be contained in the stream discharging through the conduit 26. The discharge from the reboiler 10 of the tower A, which is rich in carbon dioxide, is transferred through the conduit 16 to the inlet 18 of the tower B. Also, the effluent being transferred through the conduit 16 is increased in pressure by the compressor 20 to the desired pressure of the tower B.

Tower B is maintained at a pressure greater than the pressure at which carbon dioxide will solidify on the feed plates of the tower when the carbon dioxide is contained in a predominantly methane feed stream. As indicated in Figure 1, a typical feed stream entering tower B may have a carbon dioxide concentration of 30 percent. It has been found that when the tower B is maintained at a pressure greater than 715 p.s.i.a., the carbon dioxide entering the tower B will not solidify.

The stream entering the tower B through the inlet 18 will be distilled to provide a top effluent having a limited carbon dioxide concentration, and a bottom effluent of substantially pure carbon dioxide. The bottom effluent of the tower B is partially recycled through the respective conduit 12, reboiler 10, and conduit 14 to maintain the bottom temperature of the tower B sufficent that solid carbon dioxide will not form in the lower portion of the tower. This bottom temperature is preferably in the neighborhood of +57° F. The outlet 28 of the reboiler 10 of the tower B is connected to any suitable mechanism (not shown) for flaring the substantially pure carbon dioxide. It should be noted, however, that the bottom product of the tower B being discharged through the conduit 28 may be throttled before flaring and a substantial amount of refrigeration can be obtained.

The top product of tower B is partially refluxed through the respective conduits 6 and 8 and the respective reflux unit 4 to provide a liquid in the upper portion of the tower at a temperature approximating −100° F. The carbon dioxide content of this top product will depend upon the operating pressure of the tower B. When the pressure of the tower is approximately 715 p.s.i.a., the top product will have a carbon dioxide concentration less than 8 mole percent. However, as the pressure increases, the carbon dioxide concentration increases. Since this top product is recycled to tower A, as will be hereinafter set forth, it is desirable that this product, or effluent, contain less than 8 mole percent carbon dioxide. Therefore, the pressure of tower B is maintained in the vicinity of 715 p.s.i.a.

Figure 4:
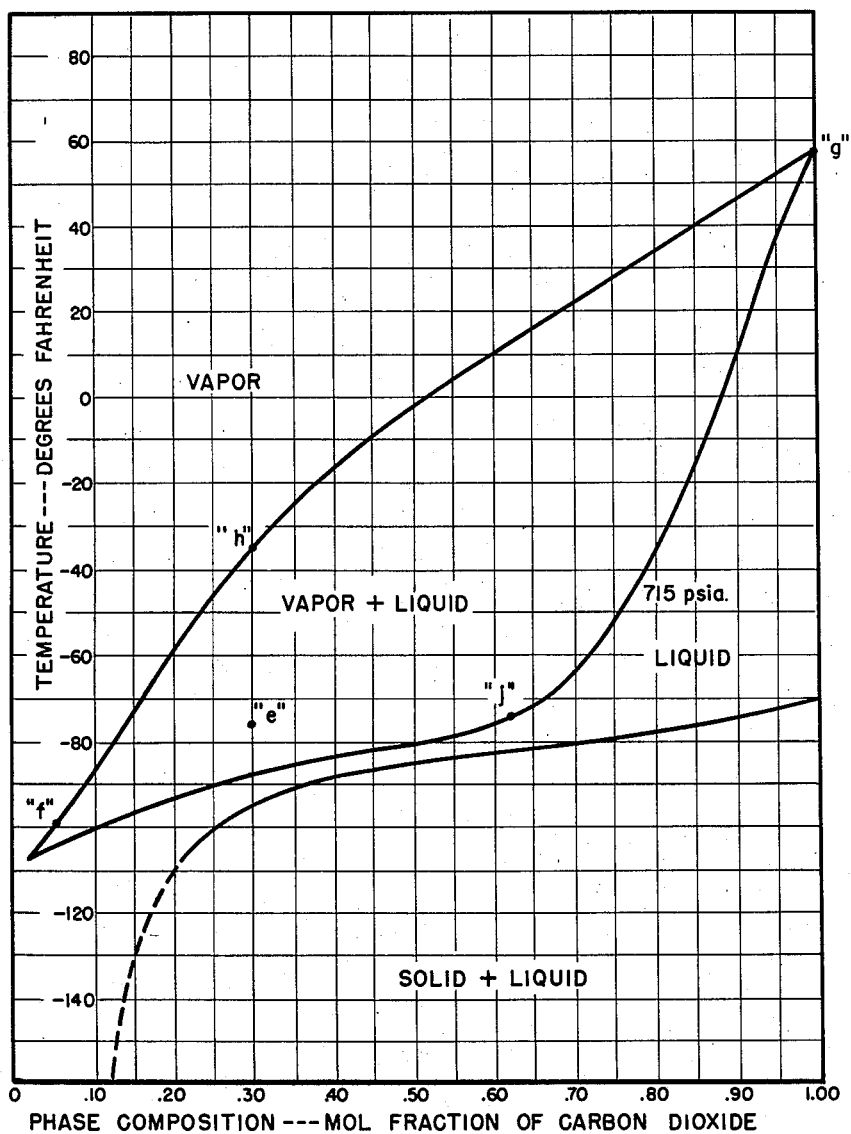

I have also shown (Fig. 4) the phase diagram for methane-carbon dioxide mixtures at 715 p.s.i.a. to facilitate an understanding of the process carried out in tower B. The feed stream to tower B, as previously stated, contains approximately a 30 percent concentration of carbon dioxide and the condition thereof is indicated at point $e$. This stream is separated by distillation to provide a methane-rich top product containing approximately 5 percent carbon dioxide as represented by point $f$, as well as a substantially pure carbon dioxide bottom product as represented by point $g$. The line $fhg$ represents the compositions of the gases rising through the tower, and the line $fjg$ represents the compositions of the liquid falling through the tower. It will thus be seen that by operating tower B at 715 p.s.i.a., the major portion of the carbon dioxide will be removed to provide a top product containing less than 8 mole percent carbon dioxide; without the formation of solid carbon dioxide in the tower. As will be observed from the phase diagram, the liquid-vapor zone is completely above the solid carbon dioxide zone. Therefore, as long as the stream in tower B is maintained in the liquid-vapor phase, solid carbon dioxide will not form.

The outlet of the reflux unit 4 of the tower B is directed through conduit 21 and the throttling valve 24 to reduce the pressure of the recycled stream and combine the recycled stream with the incoming feed gas in conduit 22. It will then be apparent that the recycled gas and a new charge of the original feed gas are passed through the process to obtain a further removal of carbon dioxide.

As previously indicated, the process illusrated by Figure 1 is used when the feed gas has a carbon dioxide content less than 8 mole percent. An important feature of this process is that the tower B can be made substantially smaller than the tower A. An examination of the typical process calculations noted adjacent the discharge conduit 26 of the reflux unit 4 for tower A reveals that substantially 95 percent of the original feed stream is separated in tower A and is discharged as substantially pure methane. Only a small portion of the original feed gas is directed through the conduit 16 to the second tower B.

The process illustrated in Figure 2 utilizes substantially the same apparatus as that described in connection with the process illustrated in Fig. 1. The towers A and B are again used and are maintained under the same operating conditions as previously described. Also, each of the towers A and B is provided with a reflux unit and a reboiler unit (not shown) in the same manner as previously described. However, the feed gas is directed initially into tower B in the process illustrated in Figure 2 to provide an initial, partial separation of the carbon dioxide.

Figure 2:
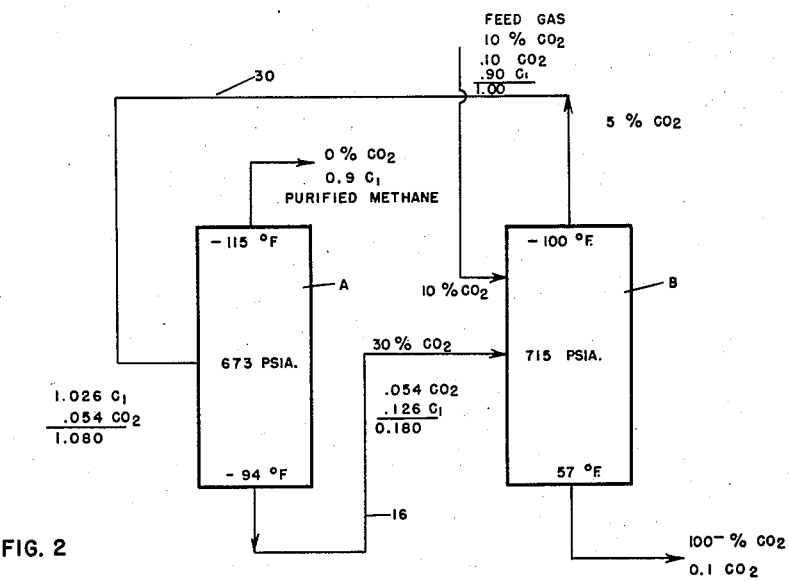
Figure 2 is a flow diagram illustrating a process of removing carbon dioxide from natural gas when the concentration of the carbon dioxide is greater than 8 mole percent.

As previously indicated, the process illustrated in Figure 2 is used when the feed stream has a carbon dioxide concentration in excess of 8 mole percent. Typical process calculations are shown on the drawing for a feed stream containing 10 percent carbon dioxide. The calculations are based on one mole of the feed gas. When the feed gas is directed into tower B, a large portion of the carbon dioxide will be removed in the bottom product. The top product, which is predominantly methane, contains less than 8 mole percent carbon dioxide, depending upon the operating pressure of tower B. The top product containing the limited concentration of carbon dioxide is recycled and throttled through a conduit 30 to the medial portion of tower A to provide a feed gas into tower A under substantially the same conditions as described in connection with Figure 1.

The gas will be distilled in tower A to provide a top product of substantially pure methane, and a bottom product which is rich in carbon dioxide. The major portion of the gas entering tower A will be discharged as the top product. Therefore, the bottom product of tower A will have a carbon dioxide concentration in excess of 8 mole percent. This bottom product is directed through the conduit 16 (as in the previous discussion) into the tower B for further distillation along with the original feed gas. Thus, the bottom product of tower A is further processed in tower B to provide a further removal of carbon dioxide.

In summarizing the variations in the process described above, it will be observed that in each instance the feed gas or gas stream is passed through two towers, wherein one tower is maintained at a pressure in the vicinity of the critical pressure of methane and the remaining tower is maintained at a pressure sufficiently high to prevent solidification of carbon dioxide when the carbon dioxide is contained in methane at a concentration in excess of 8 mole percent. In one instance (when the feed gas contains less than 8 mole percent carbon dioxide) the feed gas is initially directed into the lower pressure tower to provide a substantially complete separation of the carbon dioxide from the major portion of the feed gas. In another instance (when the feed gas contains carbon dioxide at a concentration in excess of 8 mole percent) the feed gas is directed into the second tower to obtain a partial separation of carbon dioxide, whereby the concentration of carbon dioxide in the main gas stream is reduced below 8 mole percent. Thus, one or the other of the above-described embodiments can be utilized to remove carbon dioxide from a natural gas stream, regardless of the carbon dioxide concentration.

This invention also contemplates the removal of carbon dioxide from a natural gas stream containing more than 8 mole percent carbon dioxide by directing the gas stream initially into the tower A. Such a process may be used to advantage when the composition of the feed stream permits the stream to be throttled from a higher pressure down to below the critical pressure of methane (673 p.s.i.a.) without clogging the throttling apparatus. If the feed gas can be chilled by throttling from a higher pressure down to 673 p.s.i.a., solid carbon dioxide will not form on the feed plates of tower A, even though the carbon dioxide concentration exceeds 8 percent, providing the concentration remains less than the concentration of the bottom product. When a gas stream containing carbon dioxide in excess of 8 mole percent is chilled to 673 p.s.i.a., the carbon dioxide passes through a solid-vapor phase, and very delicate apparatus must be utilized to prevent the adherence of the solid carbon dioxide to the walls of the expansion device (such as a throttling valve) to prevent disruption of the apparatus. Therefore, such a gas may be chilled and introduced directly into the low pressure tower A only under optimum conditions.

It will be understood by those skilled in the art that when constituents other than methane and carbon dioxide are present in the feed stream in appreciable amounts, the specific operating conditions of the tower will be altered accordingly.

From the foregoing, it will be apparent that the present invention provides an economical process of removing carbon dioxide from natural gas. The carbon dioxide is removed by distillation, and the carbon dioxide may be removed, regardless of the concentration thereof in the gas stream. The carbon dioxide is removed without the formation of solid carbon dioxide in the distillation towers; and the equipment required is simple in construction and is well known in the petroleum industry. It is also apparent that the present invention provides a simple process of removing the major portion of carbon dioxide from a natural gas stream, particularly when the gas contains a high concentration of carbon dioxide.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. The process of separating $CO_2$ from a methane feed stream in which it is present which comprises passing such stream through the following towers: (a) tower A, the effluent from the top of which is substantially pure methane; the feed to which contains a concentration of $CO_2$ below that at which a solid $CO_2$ phase will form at the operating pressure and temperature of the tower; the effluent from the bottom of which contains substantially all of the $CO_2$ from the feed; and wherein the operating pressure is in the vicinity of but below the critical pressure of methane and through which a part of the substantially pure methane effluent from the top of the tower, after liquefaction, is refluxed and the bottom temperature is maintained such that solidification of $CO_2$ at said operating pressure is precluded, and (b) tower B, the effluent from the top of which contains substantially the same concentration of $CO_2$ as the feed to tower A and is admixed with said feed; the feed to which is the bottom effluent of tower A and contains a concentration of $CO_2$ sufficient such that upon cooling thereof below that certain pressure at which a solid $CO_2$ phase will exist; the effluent from the bottom of which is substantially pure $CO_2$; and above which pressure solid $CO_2$ will not coexist with a vapor and wherein the operating pressure is maintained in the vicinity of but above said certain pressure.

2. The process of claim 1 characterized further in that the feed to tower A contains less than eight mole percent $CO_2$.

3. The process of claim 1 characterized further in that the feed to tower B contains more than eight mole percent $CO_2$.

4. The process of claim 1 characterized further in that said certain pressure is 715 p.s.i.a.

5. The process of claim 1 characterized further in that the temperature at all points in the process is such that solidification of $CO_2$ is precluded.

6. The process of removing carbon dioxide from a predominantly methane stream by a first and second distillation towers, which comprises maintaining the first tower slightly below the critical pressure of methane, maintaining the second tower slightly above the pressure at which carbon dioxide will solidify when combined with methane, directing the bottom effluent of the first tower to the medial portion of the second tower, directing the top effluent from the second tower to the medial portion of the first tower, and directing the stream sequentially through the towers in accordance with the initial carbon dioxide content of the stream.

7. The process of removing carbon dioxide from a predominantly methane stream by a first and second distillation towers, which comprises maintaining the first tower slightly below the critical pressure of methane, maintaining the second tower slightly above the pressure at which carbon dioxide will solidify when combined with methane, directing the bottom effluent of the first tower to the medial portion of the second tower, directing the top effluent from the second tower to the medial portion of the first tower, directing the stream sequentially through the towers in accordance with the initial carbon dioxide content of the stream, and maintaining the temperature of the stream throughout the process at a level such that the formation of solids is precluded.

8. In a process of separating carbon dioxide from a predominantly methane feed stream containing less than eight mole percent carbon dioxide, which includes feeding the stream to the medial portion of a distillation tower for separating the major portion of the methane into the upper portion of the tower and the remaining portion of the methane, with the carbon dioxide, into the lower portion of the tower, maintaining the pressure of the tower in the vicinity of but less than the critical pressure of methane, withdrawing effluent from the top and bottom portions of the tower, refluxing the top effluent of the tower, and maintaining the lower portion of the tower at a temperature above the temperature at which solid carbon dioxide will form.

References Cited in the file of this patent

UNITED STATES PATENTS

| | | |
|---|---|---|
| 668,197 | Le Sueur | Feb. 19, 1901 |
| 1,620,192 | Claude | Mar. 8, 1927 |
| 1,664,412 | Haynes | Apr. 3, 1928 |
| 1,853,743 | Pollitzer | Apr. 12, 1932 |
| 2,175,590 | Barton | Oct. 10, 1939 |
| 2,327,134 | Schuftan | Aug. 17, 1943 |
| 2,551,399 | Silverberg | May 1, 1951 |
| 2,585,288 | Van Nuys | Feb. 12, 1952 |
| 2,596,785 | Nelly | May 13, 1952 |
| 2,603,310 | Gilmore | July 15, 1952 |
| 2,632,316 | Eastman | Mar. 29, 1953 |
| 2,729,291 | Haverfield | Jan. 3, 1956 |
| 2,738,658 | Bronson | Mar. 20, 1956 |